(12) United States Patent
Fujimori (10) Patent No.: US 11,172,175 B2
(45) Date of Patent: *Nov. 9, 2021

(54) METHOD FOR CONTROLLING DISPLAY DEVICE, AND DISPLAY DEVICE

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,414

(22) Filed: Jul. 10, 2020

(65) Prior Publication Data

US 2021/0014463 A1    Jan. 14, 2021

(30) Foreign Application Priority Data

Jul. 12, 2019  (JP) .............................. JP2019-129994

(51) Int. Cl.
*H04N 9/31* (2006.01)
*G06F 3/14* (2006.01)

(52) U.S. Cl.
CPC ......... *H04N 9/3147* (2013.01); *G06F 3/1423* (2013.01); *H04N 9/3185* (2013.01)

(58) Field of Classification Search
CPC .... G06F 13/4247; G06F 13/37; G06F 3/1423; G06F 3/1446; H04L 12/42; H04L 41/12; G09G 2370/12; G09G 2300/026; H04N 9/3147
See application file for complete search history.

(56) References Cited

U.S. PATENT DOCUMENTS

| | | | | |
|---|---|---|---|---|
| 7,644,216 B2* | 1/2010 | Fahr | ...................... | G06F 13/385 710/301 |
| 8,237,624 B2* | 8/2012 | Zeng | ..................... | G06F 3/1431 345/1.1 |
| 8,914,549 B2* | 12/2014 | Klughart | ............... | G06F 3/0689 710/5 |
| 2002/0075886 A1* | 6/2002 | Tagore-Brage | ......... | H04L 12/43 370/424 |
| 2002/0089531 A1* | 7/2002 | Hirasawa | ................ | H04L 41/12 715/735 |

(Continued)

FOREIGN PATENT DOCUMENTS

| | | |
|---|---|---|
| JP | 2012-019442 A | 1/2012 |
| JP | 2017-142339 A | 8/2017 |
| JP | 2019-024180 A | 2/2019 |

*Primary Examiner* — Paulos M Natnael
(74) *Attorney, Agent, or Firm* — Oliff PLC (57) ABSTRACT

A projector includes: a determination unit determining whether a daisy chain function executed by the projector when daisy-chained to another device is set as enabled or not; and a setting unit setting a display source to which an image signal to be a source of an image displayed by the projector is inputted, to one of the plurality of interfaces. The setting unit sets a supporting interface supporting the daisy-chaining as the display source when it is determined by the determination unit that the daisy chain function is set as enabled. The setting unit does not change the display source to an interface other than the supporting interface even when the image signal is not inputted to the supporting interface.

6 Claims, 4 Drawing Sheets

(56) References Cited

U.S. PATENT DOCUMENTS

| | | | |
|---|---|---|---|
| 2007/0233903 A1* | 10/2007 | Pyeon | G11C 16/20 710/1 |
| 2008/0155073 A1* | 6/2008 | Swain | H04L 12/42 709/222 |
| 2013/0061271 A1* | 3/2013 | Lu | H04N 21/43615 725/74 |
| 2015/0287390 A1* | 10/2015 | Kakeko | H04L 67/10 345/1.1 |
| 2017/0124007 A1* | 5/2017 | Zehavi | G06F 13/4068 |
| 2020/0195880 A1* | 6/2020 | Momose | G06F 21/10 |

\* cited by examiner

METHOD FOR CONTROLLING DISPLAY DEVICE, AND DISPLAY DEVICE

The present application is based on, and claims priority from JP Application Ser. Number 2019-129994, filed Jul. 12, 2019, the disclosure of which is hereby incorporated by reference herein in its entirety.

BACKGROUND

1. Technical Field

The present disclosure relates to a method for controlling a display device, and a display device.

2. Related Art

According to the related art, a system having a plurality of display devices coupled together in a daisy chain so that the plurality of display devices cooperate together is known. For example, JP-A-2012-19442 discloses a projector system in which a main projector and a sub projector are daisy-chained.

To couple a plurality of display devices in a daisy chain and cause the display devices to cooperate together, each of the plurality of projectors must be set. Therefore, a simple operation to cause the plurality of projectors to cooperate together is desired.

SUMMARY

An aspect of the present disclosure is directed to a method for controlling a display device having a plurality of interfaces including: a determination step of determining whether a function executed by the display device when coupled to another device in a daisy chain is set as enabled or not; and a setting step of setting an input interface to which an image signal to be a source of an image displayed by the display device is inputted, to one of the plurality of interfaces. In the setting step, when it is determined in the determination step that the function is set as enabled, a supporting interface supporting the coupling in the daisy chain is set as the input interface. Even when the image signal is not inputted to the supporting interface, the input interface is not changed to an interface other than the supporting interface.

The method for controlling a display device may further include a detection step of detecting an interface to which an image signal is inputted. In the setting step, even when an input of the image signal to an interface other than the supporting interface is detected in the detection step, the interface other than the supporting interface may not be set as the input interface.

In the method for controlling a display device, in the setting step, a place in a coupling order of the coupling in the daisy chain may be determined. When the determined place in the coupling order is a first place, an interface where an input of the image signal is detected, of a plurality of the supporting interfaces provided in the display device, may be set as the input interface.

In the method for controlling a display device, in the setting step, a place in a coupling order of the coupling in the daisy chain may be determined. When the determined place in the coupling order is not a first place, the supporting interface that is one preset supporting interface, of a plurality of the supporting interfaces provided in the display device, may be set as the input interface.

In the method for controlling a display device, the supporting interface may be an interface supporting HDMI (trademark registered) or HDBaseT (trademark registered).

According to another aspect of the present disclosure is directed to a display device having a plurality of interfaces, the display device including: a determination unit determining whether a function executed by the display device when coupled to another device in a daisy chain is set as enabled or not; and a setting unit setting an input interface to which an image signal to be a source of an image displayed by the display device is inputted, to one of the plurality of interfaces. The setting unit sets a supporting interface supporting the coupling in the daisy chain as the input interface when it is determined by the determination unit that the function is set as enabled. The setting unit does not change the input interface to an interface other than the supporting interface even when the image signal is not inputted to the supporting interface.

DESCRIPTION OF EXEMPLARY EMBODIMENTS

An embodiment of the present disclosure will now be described with reference to the accompanying drawings.

Figure 1:
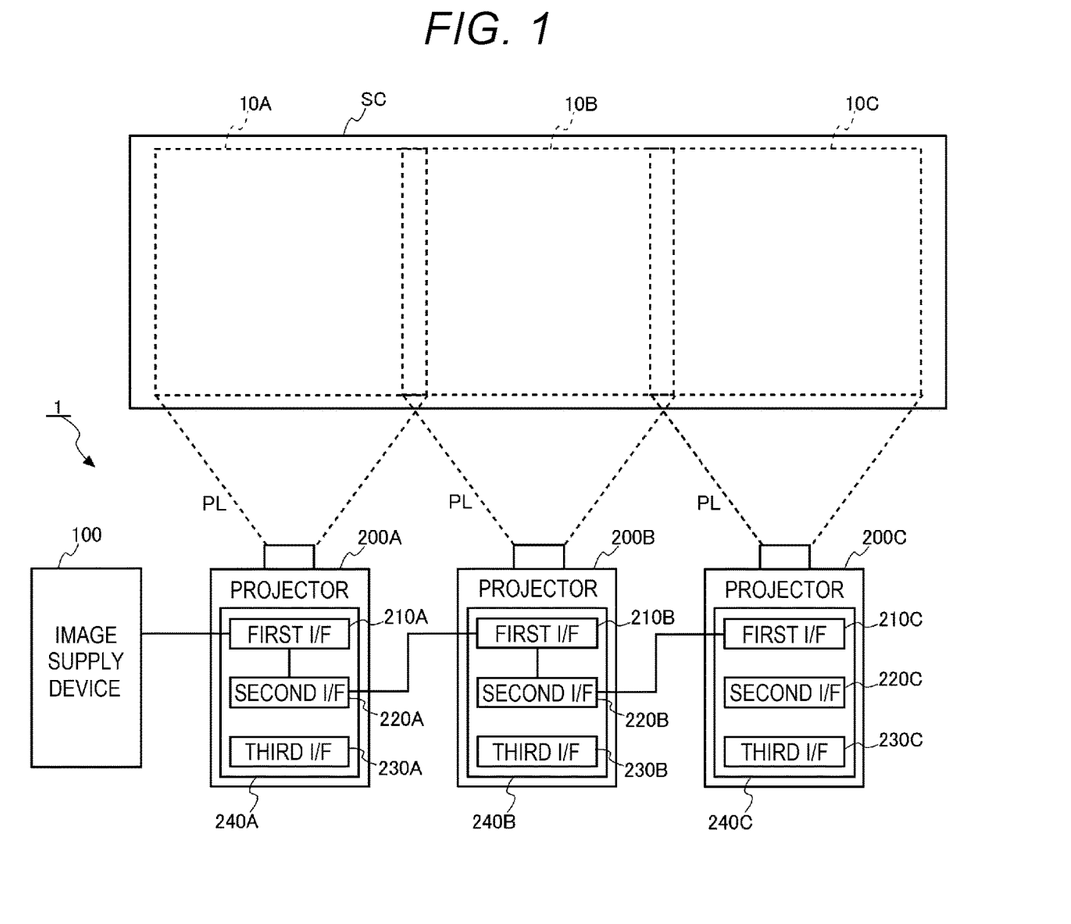
FIG. 1 shows a system configuration.

FIG. 1 shows a system configuration according to an embodiment of the present disclosure.

A system 1 shown in FIG. 1 has an image supply device 100 and a plurality of projectors 200. The projector 200 is equivalent to an example of the "display device" according to the present disclosure. The image supply device 100 and the plurality of projectors 200 can be coupled together in a daisy chain. When the plurality of projectors 200 are coupled together in a daisy chain, these projectors 200 can made to cooperate. The plurality of projectors 200 can also be made to operate individually. The coupling in a daisy chain is referred to as daisy-chaining. The daisy-chaining is a coupling method in which a plurality of devices communicating with each other are coupled in series via a communication line.

The image supply device 100 is a device supplying an image signal to the projector 200. The projector 200 is a device generating image light PL based on the supplied image signal and projecting the image light PL onto a screen SC, which is a projection surface. An image corresponding to the image light PL is displayed on the screen SC. The screen SC is formed of a planar surface or curtain and its specific shape is arbitrary. The projection surface may be a uniform planar surface such as a wall surface, ceiling surface or floor surface and may also have a curved surface or concave/convex surface.

As the image supply device 100, for example, a notebook PC (personal computer), desktop PC, tablet PC, smartphone, PDA (personal digital assistant) or the like can be used. Also, a video playback device, DVD player, Blu-ray disc player, hard disk recorder, television tuner, CATV (cable television) set-top box, video game machine or the like may be used as the image supply device 100.

FIG. 1 shows three projectors 200, that is, a projector 200A, a projector 200B, and a projector 200C. However, the number of projectors 200 forming the system 1 is arbitrary. In the description below, the term "projector 200" is used as a general term for the projector 200A, the projector 200B, and the projector 200C.

FIG. 1 shows an example where the three projectors 200, that is, the projectors 200A, 200B, and 200C, are arranged next to each other in the lateral direction of the screen SC. The arrangement of the projectors 200 is not limited to next to each other in the lateral direction shown in FIG. 1. For example, four projectors 200 can be arranged in a matrix of two columns by two rows.

The projectors 200A, 200B, and 200C projects the image light PL into different areas from each other, on the screen SC. The area where the projector 200A projects the image light PL is referred to as a projection area 10A. The area where the projector 200B projects the image light PL is referred to as a projection area 10B. The area where the projector 200C projects the image light PL is referred to as a projection area 10C.

When the image supply device 100 and the plurality of projectors 200 are daisy-chained, the projector 200 located at the beginning of the daisy-chaining is referred to as a master device. That is, the projector 200 coupled to the image supply device 100 and taking in an image signal outputted from the image supply device 100 is referred to as a master device. In this embodiment, the projector 200A operates as a master device.

Also, in this embodiment, the projector 200B is coupled subsequently to the projector 200A, and the projector 200C is coupled subsequently to the projector 200B. The projector 200A is the projector 200 in the first place in the coupling order of daisy-chaining. The projector 200B is the projector 200 in the second place in the coupling order of daisy-chaining. The projector 200C is the projector 200 in the third place in the coupling order of daisy-chaining. The projectors 200B and 200C in the second and third places in the coupling order operate as slave devices.

When the projector 200A is equivalent to the "display device" according to the present disclosure, the image supply device 100 and the projector 200B are equivalent to the "another device" according to the present disclosure. Similarly, when the projector 200B is equivalent to the "display device" according to the present disclosure, the projector 200A and the projector 200C are equivalent to the "another device" according to the present disclosure. Similarly, when the projector 200C is equivalent to the "display device" according to the present disclosure, the projector 200B is equivalent to the "another device" according to the present disclosure.

The operation when the image supply device 100 and the plurality of projectors 200 are daisy-chained will now be described.

An image signal supplied from the image supply device 100 is inputted to the projector 200A. The projector 200A outputs the inputted image signal to the projector 200B on the subsequent stage. The projector 200B outputs the image signal inputted from the projector 200A, to the projector 200C on the subsequent stage. The projectors 200A, 200B, and 200C generate the image light PL based on the image signal and project the image light PL into the projection areas 10A, 10B, and 10C synchronously with a synchronization signal included in the image signal.

Each of the projectors 200A, 200B, and 200C has a plurality of interfaces. That is, the projectors 200A, 200B, and 200C can be coupled simultaneously to a plurality of image supply devices 100. FIG. 1 shows the case where each of the projectors 200A, 200B, and 200C has three interfaces. However, the number of interface provided in each projector 200 is arbitrary. For example, the projectors 200A, 200B, and 200C may have different numbers of interfaces from each other.

The projector 200A has three interfaces, that is, a first interface 210A, a second interface 220A, and a third interface 230A. The projector 200B has three interfaces, that is, a first interface 210B, a second interface 220B, and a third interface 230B. The projector 200C has three interfaces, that is, a first interface 210C, a second interface 220C, and a third interface 230C.

In the description below, an "interface 240A" is used as a general term for the first interface 210A, the second interface 220A, and the third interface 230A provided in the projector 200A. Similarly, an "interface 240B" is used as a general term for the first interface 210B, the second interface 220B, and the third interface 230B provided in the projector 200B. Similarly, an "interface 240C" is used as a general term for the first interface 210C, the second interface 220C, and the third interface 230C provided in the projector 200C. Also, an "interface 240" is used as a general term for the interfaces 240A, 240B, and 240C.

At least two interfaces 240A of the interfaces 240A provided in the projector 200A are HDMI interfaces. HDMI is a registered trademark. The HDMI interface is an interface conforming to the HDMI communication standard and supporting daisy-chaining. In this embodiment, it is assumed that the first interface 210A and the second interface 220A in the projector 200A are HDMI interfaces.

In the projector 200B, too, at least two interfaces 240B of the three interfaces 240B are HDMI interfaces. In this embodiment, it is assumed that the first interface 210B and the second interface 220B in the projector 200B are HDMI interfaces.

Also, at least one interface 240C of the interfaces 240C provided in the projector 200C is an HDMI interface. In this embodiment, it is assumed that the first interface 210C in the projector 200C is an HDMI interface.

The communication standard of the third interfaces 230A, 230B in the projector 200A and the projector 200B and the second interface 220C and the third interface 230C in the projector 200C is arbitrary. As these interfaces, for example, one of the following interfaces can be employed.

The interface applicable to the projector 200 can be, for example, a DVI (digital visual interface) or an interface corresponding to a digital interface standard such as HDMI, or Display Port. The interface may also be a VGA (video graphics array) or an analog interface such as a D-terminal or S-terminal. The interface may also be a data communication interface such as USB (universal serial bus), Ethernet, or IEEE 1394. The interface may also be a wireless communication interface such as HDBaseT, wireless LAN including Bluetooth or Wi-Fi, or NFC (near-field communication). Ethernet, HDBaseT, Bluetooth, and Wi-Fi are registered trademarks.

Figure 2:
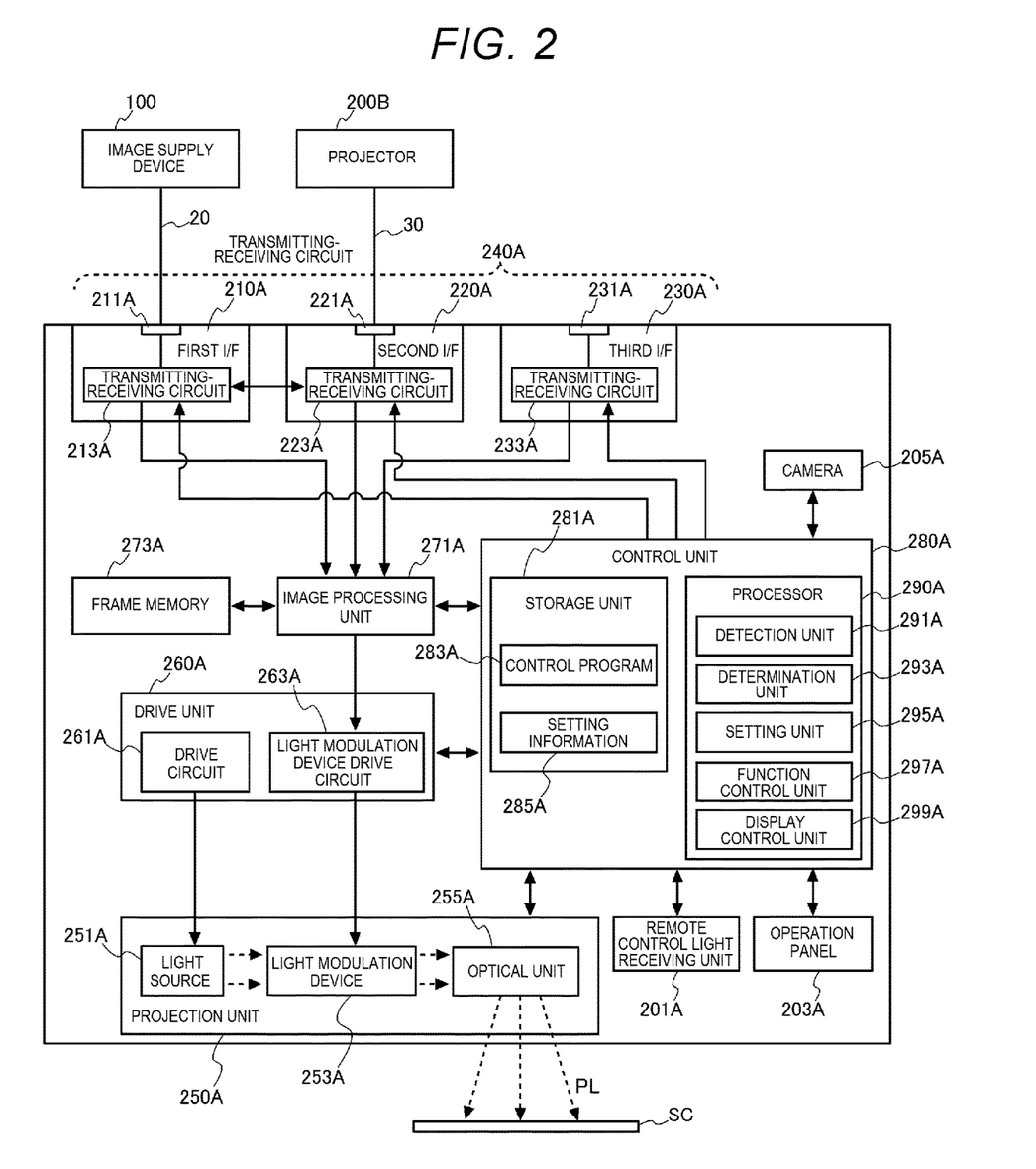
FIG. 2 is a block diagram showing the configuration of a projector.

FIG. 2 is a block diagram showing the configuration of the projector 200A.

The projector 200A, the projector 200B, and the projector 200C have substantially the same configuration. Therefore, the configuration of the projector 200A is described here as a representative example. Since FIG. 2 shows the configuration of the projector 200A, the letter "A" is added to each component of the projector 200A. In the description below, the letter "B" is added when the configuration of the projector 200B is described, and the letter "C" is added when the configuration of the projector 200C is described. For example, a control unit in the projector 200A is referred to as a "control unit 280A". A control unit in the projector 200B is referred to as a "control unit 280B". A control unit in the projector 200C is referred to as a "control unit 280C".

The first interface 210A has a connector 211A and a transmitting-receiving circuit 213A. The second interface 220A has a connector 221A and a transmitting-receiving circuit 223A. The third interface 230A has a connector 231A and a transmitting-receiving circuit 233A.

A cable coupling the projector 200A to an external device is coupled to the connectors 211A, 221A, 231A. In this embodiment, the first interface 210A and the second interface 220A are HDMI interfaces. Therefore, an HDMI cable is coupled to the connectors 211A and 221A.

FIG. 2 shows the state where the image supply device 100, the projector 200A, and the projector 200B are daisy-chained. For example, it is assumed that the image supply device 100 is coupled to the first interface 210A and that the projector 200B is coupled to the second interface 220A, as shown in FIG. 2. In this case, an HDMI cable 20 coupled to the image supply device 100 is coupled to the connector 211A, and an HDMI cable 30 coupled to the projector 200B is coupled to the connector 221A. Alternatively, the HDMI cable 20 coupled to the image supply device 100 may be coupled to the connector 221A, and the HDMI cable 30 coupled to the projector 200B may be coupled to the connector 211A.

An image signal is inputted to the connectors 211A, 221A, 231A to which the cable is coupled. The first interface 210A, the second interface 220A, and the third interface 230A receive the inputted image signal via their respective transmitting-receiving circuits 213A, 223A, 233A.

The transmitting-receiving circuit 213A of the first interface 210A and the transmitting-receiving circuit 223A of the second interface 220A perform processing such as serial-parallel conversion and signal level conversion of the received image signal. The transmitting-receiving circuits 213A and 223A also extract image data and a synchronization signal included in the received image signal, and output the extracted image data to an image processing unit 271A.

The transmitting-receiving circuits 213A, 223A, and 233A are coupled to the control unit 280A. The transmitting-receiving circuit 213A and the transmitting-receiving circuit 223A are coupled together via a signal line. The transmitting-receiving circuits 213A and 223A output the synchronization signal extracted from the received image signal to the control unit 280A. The control unit 280A controls each part of the projector 200A, based on the inputted synchronization signal. Also, the transmitting-receiving circuits 213A and 223A, on receiving the image signal, output a notification signal notifying the reception of the image signal to the control unit 280A.

It is now assumed that the image supply device 100 is coupled to the first interface 210A, as shown in FIG. 2, that the projector 200B is coupled to the second interface 220A, and that a daisy chain function, described later, is set as enabled. In this case, the control unit 280A causes the first interface 210A to output the inputted image signal to the second interface 220A. The second interface 220A outputs the inputted image signal to the projector 200B via the HDMI cable 30.

It is now assumed that the image supply device 100 is coupled to the second interface 220A, that the projector 200B is coupled to the first interface 210A, and that the daisy chain function is set as enabled. In this case, the control unit 280A causes the second interface 220A to output the inputted image signal to the first interface 210A. The first interface 210A outputs the inputted image signal to the projector 200B via the HDMI cable 30.

Also, in this embodiment, the case where the third interface 230A has the connector 231A and the transmitting-receiving circuit 233A corresponding to an analog interface is described. An analog image signal is inputted to the transmitting-receiving circuit 233A. The transmitting-receiving circuit 233A has, for example, an A/D converter and converts the inputted analog image signal into digital image data and synchronization signal via the A/D converter. The illustration of the A/D converter is omitted. The transmitting-receiving circuit 233A outputs the converted image data to the image processing unit 271A and outputs the converted synchronization signal to the control unit 280A. The transmitting-receiving circuit 233A also detects that the image signal is inputted to the A/D converter, and outputs a notification signal notifying the input of the image signal to the control unit 280A.

When the third interface 230A is a data communication interface such as USB, the transmitting-receiving circuit 233A detects an electrical change such as a voltage change in the connector 231A coupled to a signal line transmitting and receiving data, and detects the input of the image signal. When an electrical change such as a voltage change in the connector 231A is detected, the transmitting-receiving circuit 233A outputs a notification signal notifying the input of the image signal to the control unit 280A. The transmitting-receiving circuit 233A may also detect the input of the image signal on receiving a data transmission request from an external device coupled thereto.

The projector 200A has a remote control light receiving unit 201A and an operation panel 203A functioning as an acceptance unit. The remote control light receiving unit 201A receives an infrared signal transmitted from a remote controller, not illustrated. The remote controller, too, functions as apart of the acceptance unit. The remote control light receiving unit 201A outputs an operation signal corresponding to the received infrared signal, to the control unit 280A. The operation signal is a signal corresponding to an operated switch on the remote controller.

The operation panel 203A is arranged, for example, at a casing of the projector 200A and has various switches such as a power switch to turn on and off the power of the projector 200A. When a switch on the operation panel 203A is operated, an operation signal corresponding to the operated switch is inputted to the control unit 280A.

The projector 200A has a camera 205A. The camera 205A is a so-called digital camera. The camera 205A has an image sensor such as a CCD (charge-coupled device) or CMOS (complementary metal oxide semiconductor). The camera 205A has a data processing circuit generating picked-up image data based on the light reception state of the image sensor. The camera 205A outputs the generated picked-up image data to the control unit 280A.

The projector 200A has a projection unit 250A projecting the image light PL, and a drive unit 260A driving the projection unit 250A. The projection unit 250A has a light source 251A, a light modulation device 253A, and an optical unit 255A. The drive unit 260A has a drive circuit 261A and an optical modulation device drive circuit 263A.

As the light source 251A, a lamp light source such as a halogen lamp, xenon lamp or ultra-high-pressure mercury lamp is used. Also, a solid-state light source such as an LED (light-emitting diode) or laser light source may be used as the light source 251A.

The drive circuit 261A is coupled to the light source 251A. The drive circuit 261A is coupled to the light source 251A and the control unit 280A, and supplies a drive current and a pulse to the light source 251A under the control of the control unit 280A and thus turns on or off the light source 251A.

The light modulation device 253A has a light modulation element modulating light emitted from the light source 251A and generating the image light PL. The light modulation device 253A emits the image light PL modulated by the light modulation element to the optical unit 255A. As the light modulation element, for example, a transmission-type liquid crystal light valve, reflection-type liquid crystal light valve, digital mirror device or the like can be used.

To the light modulation device 253A, the optical modulation device drive circuit 263A is coupled. The optical modulation device drive circuit 263A is coupled to the image processing unit 271A and the light modulation device 253A and draws an image corresponding to image data inputted from the image processing unit 271A, frame by frame at the light modulation element. For example, when the light modulation device 253A is formed of a liquid crystal light valve, the optical modulation device drive circuit 263A is formed of a driver circuit driving the liquid crystal.

The optical unit 255A has an optical element such as a lens or mirror and projects the image light PL modulated by the light modulation device 253A toward the screen SC. Thus, an image based on the image light PL is formed on the screen SC.

The projector 200A has the image processing unit 271A and a frame memory 273A. The image processing unit 271A loads image data inputted to one of the first interface 210A, the second interface 220A, and the third interface 230A, into the frame memory 273A. The frame memory 273A is formed of, for example, an SDRAM (synchronous dynamic random-access memory).

The image processing unit 271A performs image processing of the image data loaded in the frame memory 273A. The image processing performed by the image processing unit 271A includes, for example, resolution conversion processing or resizing processing, distortion correction, shape correction processing, digital zoom processing, adjustment of the color tone or luminance of the image, and the like. The image processing unit 271A executes processing designated by the control unit 280A and performs processing using a parameter inputted from the control unit 280A according to need. The image processing unit 271A can execute a combination of a plurality of types of processing of the above. The image processing unit 271A reads out the image data from the frame memory 273A and outputs the read-out image data to the optical modulation device drive circuit 263A.

The image processing unit 271A and the frame memory 273A are formed of, for example, an integrated circuit. The integrated circuit includes LSI, ASIC (application-specific integrated circuit), PLD (programmable logic device), FPGA (field-programmable gate array), SoC (system on chip), and the like. An analog circuit may be included in a part of the configuration of the integrated circuit. Also, a combination of the control unit 280A and the integrated circuit may be employed.

The projector 200A has the control unit 280A. The control unit 280A is a computer device having a storage unit 281A and a processor 290A. The storage unit 281A has a volatile storage device such as a RAM (random-access memory) and a non-volatile storage device such as ROM (read-only memory) or flash memory. The storage unit 281A stores a control program 283A executed by the processor 290A.

The storage unit 281A stores setting information 285A. The setting information 285A is information set by the user operating the remote controller or the operation panel 203A and information that can be changed by the user operating the remote controller or the operation panel 203A.

The setting information 285A includes, for example, information setting a daisy chain function as enabled or disabled, and information representing the place in the coupling order of daisy-chaining. In the case of the coupling state shown in FIG. 1, the place of the projector 200A in the coupling order is set to the first place. The place of the projector 200B in the coupling order is set to the second place. The place of the projector 200C in the coupling order is set to the third place.

The daisy chain function is the function of coupling a plurality of devices in a daisy chain. Specifically, the daisy chain function includes the function of fixing the interface 240 to which an image signal supplied from the device in the higher place in the order is inputted, as a supporting interface supporting the daisy-chaining, and the function of outputting the inputted image signal to the device in the lower place in the order. The daisy chain function can also include the function of extracting image data from an image signal supplied from the device in the higher place in the order and slicing out an image data part which this projector 200 is to display.

The supporting interface is an interface that supports daisy-chaining and can output an image signal inputted from the device in the higher place in the order to the device in the lower place in the order. In this embodiment, an interface corresponding to HDMI is set as the supporting interface. With an HDMI interface employed as the supporting interface, a digital image signal inputted from the device in the higher place in the order can be directly outputted to the device in the lower place in the order.

The setting information 285A includes information about the interface 240A that can be set as a display source, when the daisy chain function is enabled. The display source means the interface 240A to which an image signal to be the source of the image light PL projected by the projection unit 250A of the projector 200A. The display source is equivalent to the "input interface" according to the present disclosure. The information about the interface 240A that can be set as the display source is used to fix the supporting interface as the display source, when the daisy chain function is set as enabled. When the daisy chain function is enabled, the information about the interface 240A that can be set as the display source cannot be changed even by an operation on the remote controller or the operation panel by the user.

The interface 240A that can be set as the display source differs depending on the place of the projector in the coupling order of daisy-chaining. For example, when the place of the projector in the coupling order of daisy-chaining is the first place, the interface 240A supporting the HDMI interface is registered as the interface 240A that can be set as the display source. In the case of the projector 200A, which is in the first place in the coupling order, the first interface 210A and the second interface 220A are registered as the interface 240A that can be set as the display source.

Meanwhile, when the place of the projector in the coupling order is not the first place, one preset supporting interface 240A, of the interfaces 240A supporting the HDMI interface, is registered as the interface 240A that can be set as the display source. For example, in the case of the projector 200B, the first interface 210B and the second interface 220B support the HDMI interface. However, in the case of the projector 200B, the first interface 210B, which is preset, is registered as the interface 240B that can be set as the display source. In the projector 200C, as in the projector 200B, the first interface 210C, which is preset, is registered as the interface 240C that can be set as the display source.

The processor 290A is an arithmetic processing device formed of a CPU (central processing unit) or MPU (microprocessing unit). The processor 290A executes the control program 283A and thus controls each part of the projector 200A. The processor 290A may be formed of a single processor or a plurality of processors. The processor 290A may also be formed of a SoC (system on chip) integrated with a part or the entirety of the storage unit 281A or another circuit. The processor 290A may also be formed of a combination of a CPU executing a program and a DSP (digital signal processor) executing predetermined arithmetic processing. All of the functions of the processor 290A may be installed on hardware. Also, the processor 290A may be formed using a programmable device.

The control unit 280A operates as a detection unit 291A, a determination unit 293A, a setting unit 295A, a function control unit 297A, and a display control unit 299A. These blocks are illustrations of functions realized by the processor 290A executing a command set described in the control program 283A and performing data computation and control.

The detection unit 291A detects an input of an image signal to the first interface 210A, the second interface 220A, and the third interface 230A provided in the projector 200A. The detection unit 291A detects the interface 240A to which the image signal is inputted, based on a notification signal inputted from the transmitting-receiving circuits 213A, 223A, and 233A.

The determination unit 293A determines whether the daisy chain function is enabled or not with reference to the setting information 285A, when the processor 290A starts up. The determination unit 293A notifies the setting unit 295A of the result of the determination.

The setting unit 295A sets one of the first interface 210A, the second interface 220A, and the third interface 230A as the display source.

The setting unit 295A first sets, as the display source, the interface 240A previously set as the display source before the power of the projector 200A is turned off. Subsequently, when the determination unit 293A determines that the daisy chain function is disabled, the setting unit 295A determines whether an image signal is inputted to the interface 240A set as the display source or not. When an image signal is inputted to the display source, the setting unit 295A does not change the display source. When an image signal is not inputted to the display source and an image signal is inputted to another interface 240A, the setting unit 295A sets the interface 240A where the input is detected, as the display source.

Meanwhile, when the daisy chain function is enabled, the setting unit 295A sets the display source with reference to the setting information 285A. For example, when it is determined with reference to the setting information 285A that the place of the projector in the coupling order of daisy-chaining is the first place, the setting unit 295A sets the first interface 210A or the second interface 220A, which is a supporting interface, as the display source. When the detection unit 291A detects an input of an image signal to the first interface 210A, the setting unit 295A sets the first interface 210A as the display source. When the detection unit 291A detects an input of an image signal to the second interface 220A, the setting unit 295A sets the second interface 220A as the display source.

When the daisy chain function is enabled, the setting unit 295A does not sets other interfaces than the supporting interface, as the display source. For example, the setting unit 295A does not change the display source to the third interface 230A even when an image signal is not inputted to the first interface 210A or the second interface 220A, which is a supporting interface. Also, the setting unit 295A does not set the third interface 230A as the display source even when an input of an image signal to the third interface 230A is detected.

When the place of the projector in the coupling order of daisy-chaining is not the first place, the setting unit 295A sets one preset supporting interface as the display source. For example, the setting unit 295B in the projector 200B sets the first interface 210B as the display source. The setting unit 295C in the projector 200C sets the first interface 210C as the display source.

When the daisy chain function is enabled, the setting units 295B and 295C do not set other interfaces than the one preset supporting interface, as the display source. For example, the setting unit 295B does not set the second interface 220B or the third interface 230B as the display source even when an image signal is not inputted to the first interface 210B. Also, the setting unit 295B does not set the other interfaces 240B than the first interface 210B as the display source even when an input of an image signal to the second interface 220B and the third interface 230B is detected. The same applies to the setting unit 295C.

The setting units 295B and 295C do not accept an operation to change the display source even when this operation is inputted via the remote controller or the operation panel 203. For example, it is assumed that an operation to change the display source is inputted via the remote controller or the operation panel 203 in the state where the daisy chain function is enabled. In this case, the setting units 295B and 295C do not accept the operation inputted via the remote controller or the operation panel 203 and do not change the display source, which is the first interfaces 210B, 210C.

In this embodiment, the determination units 293A to 293C and the setting units 295A to 295C execute the above processing when the projectors 200A to 200C are supplied with electric power and thus start up.

The determination units 293A to 293C and the setting units 295A to 295C may execute the above processing at another timing than the startup of the projectors 200A to 200C. For example, the determination unit 293A and the setting unit 295A may execute the processing at a timing when the daisy chain function included in the setting information 285A is changed from being disabled to being enabled via the remote controller or the operation panel 203A. The same applies to the determination unit 293B and the setting unit 295B in the projector 200B, and the determination unit 293C and the setting unit 295C in the projector 200C.

The function control unit 297A controls the execution of the daisy chain function. The daisy chain function, the execution of which is controlled by the function control unit 297A, includes, for example, an image signal output function and an image slicing function.

The image signal output function is the function of outputting an image signal inputted from the device in the higher place in the order to the device in the lower place in the order. For example, it is assumed that the image supply device 100 is coupled in a higher place than the projector 200A and that the projector 200B is coupled in a lower place than the projector 200A, as shown in FIG. 2. In this case, the projector 200A outputs an image signal inputted to the first interface 210A, directly to the second interface 220A. The second interface 220A outputs the image signal inputted from the first interface 210A, to the projector 200B in the lower place.

The image slicing function is the function of slicing out partial image data that is data of a part of image data, from the image data. The function control unit 297A outputs slicing range information about slicing out the partial image data to the image processing unit 271A and causes the image processing unit 271A to execute the slicing of the partial image data. The slicing range information may be set, for example, by the user operating the remote controller or the operation panel 203A. Alternatively, the slicing range information may be generated based on the picked-up image data from the camera 205A.

In the case of generating the slicing range information based on the picked-up image data from the camera 205A, first, the projectors 200A, 200B, and 200C display a prepared pattern image onto the screen SC. The projectors 200S, 200B, and 200C pick up an image of the screen SC, where the pattern image is displayed, via their respective cameras 205A, 205B, and 205C, and generate picked-up image data. Subsequently, the projectors 200A, 200B, and 200C detect an image range where the pattern image is displayed by the projectors 200A, 200B, and 200C, based on the picked-up image data. This image range is an entire range where an image based on the image light PL projected by the projectors 200A, 200B, and 200C is displayed.

Next, the projector 200A independently displays a pattern image onto the screen SC, picks up an image of the screen SC, where the pattern image is displayed, via the camera 205A, and generates picked-up image data. The projector 200A detects a range where the pattern image is picked up, based on the picked-up image data, and detects an image range where the pattern image is displayed by the projector 200A. The projectors 200B, 200C, too, perform this processing independently. The projector 200A generates slicing range information of the projector 200A, based on the entire image range where the projectors 200A, 200B, and 200C display the pattern image and the image range where the projector 200A displays the pattern image. The other projectors 200B, 200C perform similar processing and generate slicing range information.

The display control unit 299A controls image data inputted to the image processing unit 271A. The display control unit 299A selects the interface 240A for outputting the image data to the image processing unit 271A according to the setting by the setting unit 295A and instructs the selected interface 240A to output the image data. On receiving the instruction from the display control unit 299A, the interface 240A extracts the image data from the inputted image signal and outputs the extracted image data to the image processing unit 271A.

Figure 3:
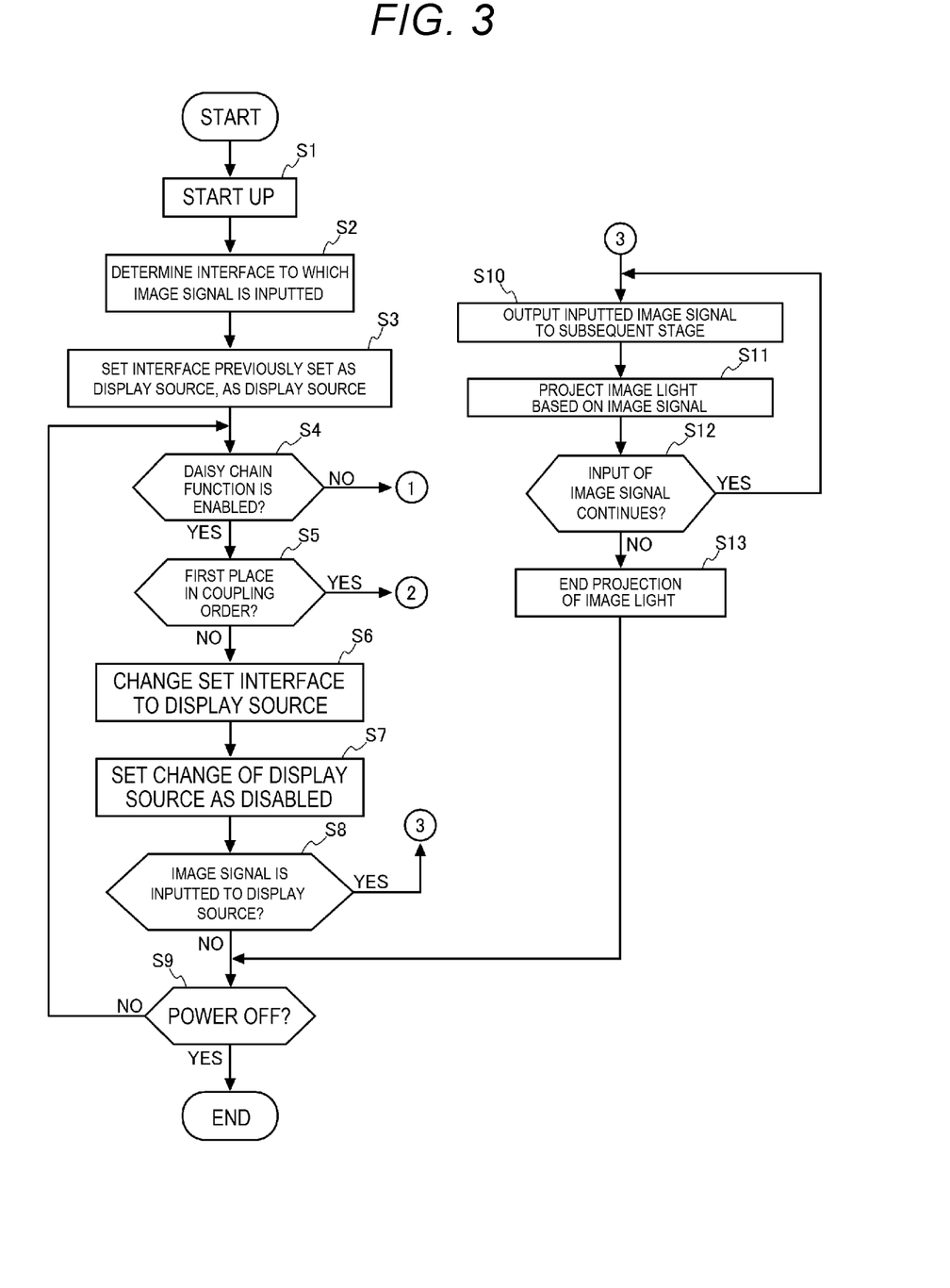
FIG. 3 is a flowchart showing the operation of the projector.

FIG. 3 is a flowchart showing the operation of the projector 200.

In this flowchart, the operation of the projector 200 is described without discriminating the projector 200A as the master device and the projectors 200B and 200C as the slave devices.

When the power switch of the projector 200 is turned on and electric power is supplied to the projector 200, the control unit 280 starts up (step S1) and starts processing. First, the control unit 280 determines the interface 240 to which an image signal is inputted (step S2). For example, when receiving an image signal from the transmitting-receiving circuits 213, 223, and 233, the control unit 280 determines the interface 240 to which an image signal is inputted, based on a notification signal notified from the transmitting-receiving circuits 213, 223, 233. When there is no interface 240 to which an image signal is inputted, the control unit 280 stores data representing "none" into the storage unit 281. When there is an interface 240 to which an image signal is inputted, the control unit 280 stores identification data of the interface 240 to which an image signal is inputted, into the storage unit 281. Step S2 is equivalent to the "detection step" according to the present disclosure.

Next, the control unit 280 sets, as a display source, the interface 240 previously set as the display source before the power of the projector 200 is turned off (step S3).

Next, the control unit 280 determines whether the daisy chain function is set as enabled or not, with reference to the setting information 285 (step S4). The operation of the control unit 280 when the daisy chain function is not set as enabled will be described later with reference to the flowchart shown in FIG. 4. Step S4 is equivalent to the "determination step" according to the present disclosure.

When the daisy chain function is set as enabled (YES in step S4), the control unit 280 determines whether the place of the projector 200 in the coupling order of daisy-chaining is the first place or not, with reference to the setting information 285 (step S5). The operation of the projector 200 in the first place in the coupling order will be described later with reference to the flowchart shown in FIG. 4. Step S5 is equivalent to the "determination step" according to the present disclosure.

On determining that the place in the coupling order is not the first place (NO in step S5), that is, on determining that the projector 200 is set as a slave device, the control unit 280 changes the display source to one preset supporting interface (step S6). In this embodiment, the first interface 210B of the projector 200B and the first interface 210C of the projector 200C are set as the display source. Step S6 is equivalent to the "setting step" according to the appended claims.

Next, the control unit 280 sets the change of the display source as "disabled" (step S7). Step S7 is equivalent to the "setting step" according to the appended claims. Based on this setting, for example, the control unit 280B in the projector 200B does not change the display source to other interfaces than the first interface 210B when an image signal is not inputted to the first interface 210B. The control unit 280B does not change the display source from the first interface 210B even when an input of an image signal to any other interface 240B than the first interface 210B is detected. The control unit 280B does not change the display source from the first interface 210B even when an operation to change the display source is inputted via the remote controller or the operation panel 203B. The control unit 280C in the projector 200C operates similarly to the control unit 280B.

Next, the control unit 280 determines whether an image signal is inputted to the display source or not (step S8). Step S8 is equivalent to the "detection step" according to the present disclosure. The projector 200B in the second place in the coupling order and the projector 200C in the third place in the coupling order determine whether an image signal is inputted to the first interface 210B and the first interface 210C, respectively, or not. Since the interface 240 to which an image signal is inputted is already determined in step S2, the control unit 280 determines whether an image signal is inputted to the display source or not, with reference to the data stored in the storage unit 281. Also, when an image signal is inputted to the display source after the lapse of a predetermined time from the startup of the projector 200, the control unit 280 takes in a notification signal from the display source and thus detects that an image signal is inputted.

When an image signal is not inputted to the display source (NO in step S8), the control unit 280 determines whether an operation to turn off the power of the projector 200 is accepted or not (step S9). The case where an image signal is not inputted to the display source includes the case where an image signal is inputted to the interface 240 other than the display source but an image signal is not inputted to the display source. The case where an image signal is not inputted to the display source also includes the case where an image signal is inputted to none of the interfaces 240 provided in the projector 200. When an operation to turn off the power of the projector 200 is not accepted (NO in step S9), the control unit 280 returns to the determination in step S4. When an operation to turn off the power of the projector 200 is accepted (YES in step S9), the control unit 280 ends this processing flow.

When an image signal is inputted to the display source in step S8 (YES in step S8) and the projector 200 is coupled in the lower place than this projector 200, the control unit 280 outputs the inputted image signal to the projector 200 in the lower place (step S10). The control unit 280 extracts image data and a synchronization signal from the inputted image signal and projects the image light PL based on the extracted image data into the projection area 10 synchronously with the synchronization signal (step S11).

Next the control unit 280 determines whether the input of the image signal continues or not (step S12). When the input of the image signal does not continue (NO in step S12), the control unit 280 ends the projection of the image light PL into the projection area 10 (step S13) and shifts to the determination in step S9. When the input of the image signal continues (YES in step S12), the control unit 280 returns to step S10 and outputs the inputted image signal to the projector 200 in the lower place.

The operation of the projector 200 as the master device when the daisy chain function is set as enabled, and the operation of the projector 200 when the daisy chain function is set as disabled, will now be described with reference to the flowchart shown in FIG. 4.

First, the operation of the projector 200 when it is determined in step S5 that the place in the coupling order is the first place will be described.

When the result of the determination in step S5 is positive (YES in step S5), the control unit 280 limits the display source to an HDMI interface (step S14). For example, in the case of the projector 200A, the first interface 210A and the second interface 220A of the interfaces 240A are HDMI interfaces. Therefore, when an image signal is inputted to the first interface 210A or the second interface 220A, the projector 200A sets the first interface 210A or the second interface 220A to which the image signal is inputted, as the display source. However, the projector 200A does not set the third interface 230A as the display source even when an image signal is inputted to the third interface 230A. Step S14 is equivalent to the "setting step" according to the appended claims.

Next, the control unit 280 determines whether an image signal is inputted to the HDMI interface or not (step S15). The control unit 280 determines whether an image signal is inputted to the HDMI interface or not, with reference to the result of the determination in step S2. Also, when an image signal is inputted to the HDMI interface after the lapse of a predetermined time from the startup of the projector 200, the control unit 280 takes in a notification signal from the HDMI interface and thus detects the input of the image signal.

When an image signal is not inputted to the HDMI interface (NO in step S15), the control unit 280 shifts to the determination in step S20. For example, the control unit 280A in the projector 200A determines that an image signal is not inputted to the HDMI interface, when an image signal is not inputted to the first and second interfaces 210A, 220A but an image signal is inputted to the third interface 230A. Also, the control unit 280A determines that an image signal is not inputted to the HDMI interface, when an image signal is not inputted to any interface 240 of the first to third interfaces 210A to 230A.

When an image signal is inputted to the HDMI interface (YES in step S15), the control unit 280 outputs the inputted image signal to the projector 200 at the subsequent stage (step S16). The control unit 280 extracts image data and a synchronization signal from the inputted image signal and projects the image light PL based on the extracted image data, into the projection area 10 synchronously with the synchronization signal (step S17).

Subsequently, the control unit 280 determines whether the input of the image signal to the display source continues or not (step S18). When the input of the image signal to the display source continues (YES in step S18), the control unit 280 continues the processing in step S16. When the input of the image signal to the display source does not continue (NO in step S18), the control unit 280 ends the projection of the image light PL (step S19). The control unit 280 then determines whether the power of the projector 200 is turned off or not (step S20). When the power of the projector 200 is turned off (YES in step S20), the control unit 280 ends this processing flow. When the power of the projector 200 is not turned off (NO in step S20), the control unit 280 returns to the determination in step S4.

The operation of the projector 200 when it is determined in step S4 that the daisy chain function is disabled (NO in step S4) will now be described.

When it is determined in step S4 that the daisy chain function is disabled (NO in step S4), the control unit 280 determines whether an image signal is inputted to the display source set in step S3 or not (step S21).

When an image signal is inputted to the display source (YES in step S21), the control unit 280 extracts image data and a synchronization signal from the inputted image signal. The control unit 280 projects the image light PL based on the extracted image data onto the screen SC synchronously with the synchronization signal (step S24).

When an image signal is not inputted to the display source (NO in step S21), the control unit 280 determines whether an image signal is inputted to another interface 240 than the interface 240 set as the displays source, or not (step S22). When an image signal is inputted to another interface 240 (YES in step S22), the control unit 280 sets this another interface 240 as the display source. That is, the control unit 280 switches the display source (step S23). The control unit 280 then extracts image data and a synchronization signal from the image signal inputted to the interface 240 set as the display source, and projects the image light PL based on the extracted image data onto the screen SC synchronously with the synchronization signal (step S24).

Subsequently, the control unit 280 determines whether the input of the image signal continues or not (step S25). When the input of the image signal does not continue (NO in step S25), the control unit 280 ends the projection of the image light PL onto the screen SC (step S26). When the input of the image signal continues (YES in step S25), the control unit 280 extracts image data from the image signal inputted to the interface 240 which is the display source. The control unit 280 projects the image light PL based on the extracted image data onto the screen SC (step S24).

On ending the projection of the image light PL onto the screen SC (step S26), the control unit 280 determines whether the power of the projector 200 is turned off or not (step S27). The control unit 280 also determines whether the power of the projector 200 is turned off or not (step S27), when an image signal is not inputted to another interface 240 (NO in step S22). When the power of the projector 200 is not turned off (NO in step S27), the control unit 280 shifts to the determination in step S4. When the power of the projector 200 is turned off (YES in step S27), the control unit 280 ends this processing flow.

As described above, the projector 200 according to this embodiment has the plurality of interfaces 240, that is, the first interface 210, the second interface 220, and the third interface 230, and the control unit 280 having the determination unit 293 and the setting unit 295.

The determination unit 293, when the projector 200 is coupled to another device in a daisy chain, determines whether the daisy chain function executed by the projector 200 is set as enabled or not.

The setting unit 295 sets one of the plurality of interfaces 240 as the display source to which an image signal to be the source of an image displayed by the projector 200 is inputted, based on the result of the detection by the detection unit 291.

When the determination unit 293 determines that the daisy chain function is set as enabled, the setting unit 295 sets a supporting interface supporting the coupling in the daisy chain, as the display source. Even when an image signal is not inputted to the supporting interface set as the display source, the setting unit 295 does not change the display source from the supporting interface.

Therefore, when the daisy chain function is set as enabled, the supporting interface is set as the display source and other interfaces than the supporting interface can be prevented from being set as the display source. Thus, when a plurality of projectors 200 are daisy-chained, the time and effort required for setting each projector 200 can be reduced and user-friendliness can be improved.

The control unit 280 has the detection unit 291. The detection unit 291 detects the interface 240 to which an image signal is inputted. Even when the detection unit 291 detects an input of an image signal to an interface other than the supporting interface, the setting unit 295 does not set this interface other than the supporting interface as the display source.

Therefore, even when an input of an image signal to an interface other than the supporting interface is detected, this interface other than the supporting interface can be prevented from being set as the display source. Thus, other functions than the daisy chain function can be restrained from operating.

The determination unit 293 determines the place of the projector in the coupling order in the daisy-chaining. When the determination unit 293 determines that the place in the coupling order is the first place, the setting unit 295 sets an interface where an input of an image signal is detected, of the plurality of supporting interfaces provided in the projector 200, as the display source.

Thus, when an input of an image signal to a supporting interface is detected, the supporting interface where this input is detected is set as the display source. This can improve user-friendliness.

When the determination unit 293 determines that the place in the coupling order is not the first place, the setting unit 295 sets one preset supporting interface of the plurality of supporting interfaces provided in the projector 200, as the display source.

Thus, in the case of the projector 200 in a lower place in the coupling order, enabling the daisy chain function enables one preset supporting interface to be set as the display source. Therefore, when coupling the projector 200 operating as a slave device in a daisy chain, the user may couple a cable to a preset supporting interface.

The supporting interface is an HDMI interface. Therefore, the supporting interface can output an inputted digital image signal directly to the device in the lower place in the daisy-chaining.

The above embodiment is a preferred embodiment of the present disclosure. However, the present disclosure is not limited to the above embodiment and can be carried out with various modifications without departing from the spirit and scope of the present disclosure.

For example, in the embodiment, the case where the interface 240 provided in the projector 200 is an interface supporting wire-coupling is described. Also, the case where the supporting interface is an interface supporting the HDMI interface is described. As a modification example, the supporting interface may be an interface supporting HDBaseT, which is a wireless standard conforming to HDMI. For example, at least one of the first interface 210A and the second interface 220A in the projector 200A may be an interface supporting HDBaseT. The same applies to the projectors 200B and 200C.

FIG. 1 illustrates a configuration where the projector 200C has one HDMI interface. However, the projector 200C may have two or more HDMI interfaces, similarly to the projector 200A and the projector 200B. For example, when the first interface 210C and the second interface 220C in the projector 200C are HDMI interfaces, the first interface 210C and the second interface 220C may be coupled together via a signal line.

It is now assumed that, for example, the daisy chain function of the projector 200C is set as enabled. It is also assumed that the projector 200B, which is in a higher place than the projector 200C, is coupled to the first interface 210C, and that a projector 200D, which is in a lower place than the projector 200C, is coupled to the second interface 220C. In this case, the control unit 280C in the projector 200C causes the first interface 210C to output an image signal inputted thereto, to the second interface 220C.

In the above embodiment, the light modulation element provided in the light modulation device 253 may be a transmission-type liquid crystal panel or a reflection-type liquid crystal panel. The light modulation element may also be configured using a digital mirror device, or a combination of a digital mirror device and a color wheel. The light modulation device 253 may also employ a configuration that can modulate light emitted from the light source, other than the liquid crystal panel and DMD.

Each functional unit in the projector 200A shown in FIG. 2 represents a functional configuration and is not particularly limited to any specific form of embodiment. That is, individual pieces of hardware corresponding to the respective functional units need not necessarily be installed. One processor can execute a program to implement functions of a plurality of functional units. Also, in the embodiment, a part of the functions implemented by software may be implemented by hardware, and a part of the functions implemented by hardware may be implemented by software. Moreover, specific details of the configuration of each of the other parts of the projector can be arbitrarily changed without departing from the spirit and scope of the present disclosure.

Figure 4:
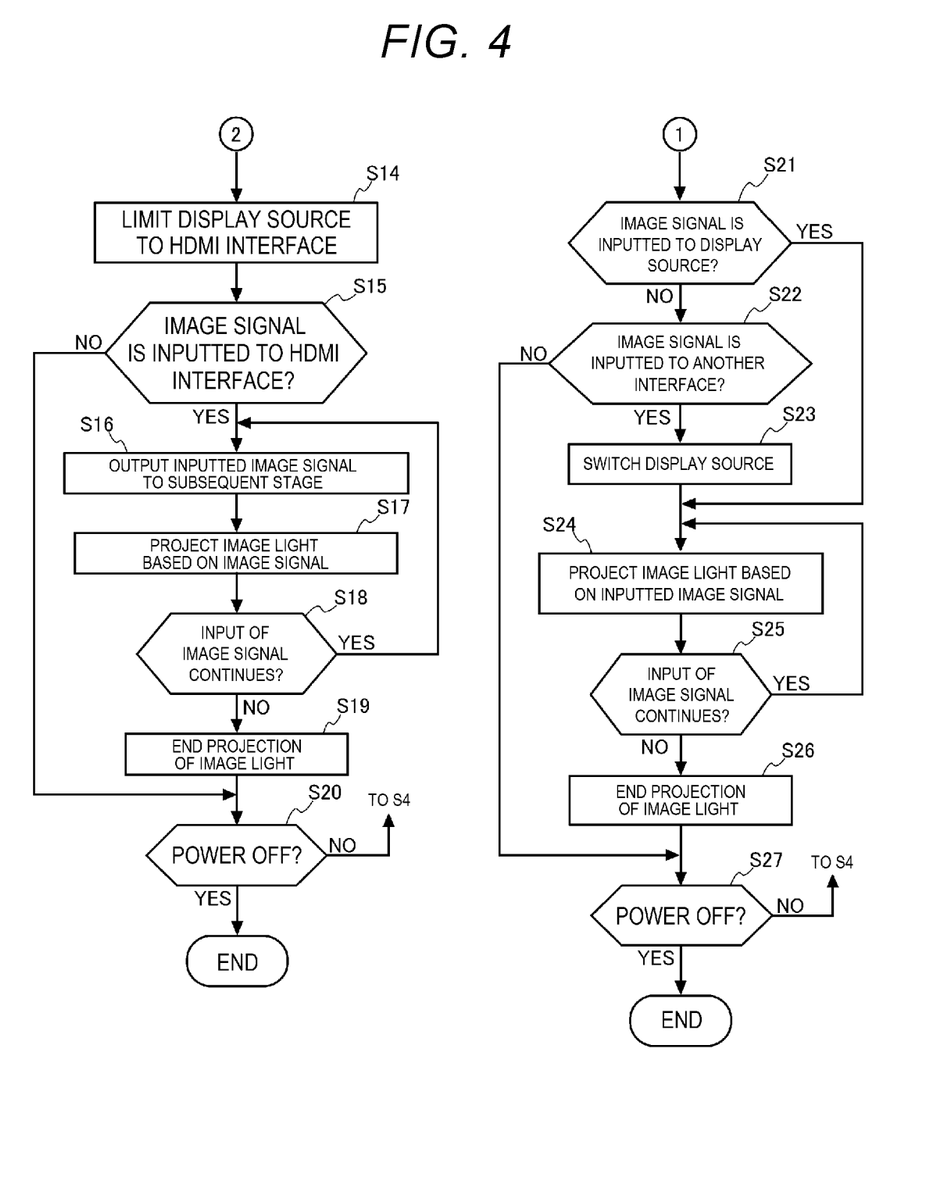
FIG. 4 is a flowchart showing the operation of the projector.

The processing steps in the flowcharts shown in FIGS. 3 and 4 are provided by dividing the processing in the projector 200 based on the main processing content in order to facilitate understanding of the processing. The way the processing is divided into processing steps and the names of the processing steps shown in the flowcharts of FIGS. 3 and 4 do not limit the present disclosure. The processing by the control unit 280 can be divided into more processing steps, based on the processing content. Also, one processing step may further divided to include more processing. The processing order in the above flowcharts is not limited to the illustrated example, either.

To implement the method for controlling the display device using a computer provided in the projector 200, the method can be implemented in the form of a recording medium storing a program executed by the computer, or a transmission medium transmitting this program. As the recording medium, a magnetic or optical recording medium, or a semiconductor memory device can be used. Specifically, a portable or fixed recording medium such as a flexible disk, HDD (hard disk drive), CD-ROM, DVD, Blu-ray disc, magneto-optical disk, flash memory, or card-type recording medium can be used. The recording medium may also be a RAM or a non-volatile storage device such as ROM or HDD that is an internal storage device provided in a server device. Blu-ray is a registered trademark.

What is claimed is:

1. A method for controlling a display device having a plurality of interfaces, the method comprising:
    a determination step of determining whether a function executed by the display device when coupled to another device in a daisy chain is set as enabled or not; and
    a setting step of setting one of the plurality of interfaces as an input interface to which an image signal to be a source of an image displayed by the display device is inputted, wherein
    the setting step includes, when it is determined in the determination step that the function is enabled, setting up a supporting interface as the input interface, the supporting interface being one of the plurality of interfaces that supports enabling the function and coupling in the daisy chain, and, even when the image signal is not inputted to the supporting interface, not changing the input interface to an interface other than the supporting interface.

2. The method for controlling the display device according to claim 1, further comprising
    a detection step of detecting an interface to which an image signal is inputted, wherein
    in the setting step, even when an input of the image signal to an interface other than the supporting interface is detected in the detection step, the interface other than the supporting interface is not set as the input interface.

3. The method for controlling the display device according to claim 1, wherein
    in the setting step, a place in a coupling order of the coupling in the daisy chain is determined, and when the determined place in the coupling order is a first place, an interface where an input of the image signal is detected, of a plurality of the supporting interfaces provided in the display device, is set as the input interface.

4. The method for controlling the display device according to claim 1, wherein
    in the setting step, a place in a coupling order of the coupling in the daisy chain is determined, and when the determined place in the coupling order is not a first place, the supporting interface that is one preset supporting interface, of a plurality of the supporting interfaces provided in the display device, is set as the input interface.

5. The method for controlling the display device according to claim 1 wherein
    the supporting interface is an interface supporting HDMI (trademark registered) or HDBaseT (trademark registered).

6. A display device having a plurality of interfaces, the display device comprising:
    a determination unit determining whether a function executed by the display device when coupled to another device in a daisy chain is set as enabled or not; and
    a setting unit setting one of the plurality of interfaces as an input interface to which an image signal to be a source of an image displayed by the display device is inputted, wherein
    the setting unit, when it is determined by the determination unit that the function is enabled, sets a supporting interface as the input interface, the supporting interface being one of the plurality of interfaces that supports enabling the function and coupling in the daisy chain, and, even when the image signal is not inputted to the supporting interface, the setting unit does not change the input interface to an interface other than the supporting interface.

* * * * *